INVENTORS
WARREN E. WICKERHAM
RALPH D. WYCKOFF
BY

ATTORNEY

March 5, 1963

W. E. WICKERHAM ETAL 3,080,507

APPARATUS FOR STABILIZING MAGNETIC FIELDS

Filed June 8, 1961

*INVENTORS*
*WARREN E. WICKERHAM*
*RALPH D. WYCKOFF*
BY

*ATTORNEY*

United States Patent Office 3,080,507
Patented Mar. 5, 1963

3,080,507
APPARATUS FOR STABILIZING MAGNETIC FIELDS
Warren E. Wickerham, Penn Hills Township, Allegheny County, and Ralph D. Wyckoff, Oakmont, Pa., assignors to Gulf Research & Development Company, Pittsburgh, Pa., a corporation of Delaware
Filed June 8, 1961, Ser. No. 115,739
24 Claims. (Cl. 317—123)

This invention relates to apparatus for controlling, maintaining, or regulating the magnetic field of an eletromagnet to a high degree of stability and precision.

In many forms of apparatus an electromagnet is employed to produce a magnetic field for the purpose of making precise physical measurements with auxiliary apparatus placed in the field and dependent on its operation in one way or another on the strength of the magnetic field. By way of example, one such application arises in mass spectrometers in which the magnetic field sets up forces on an ion beam whereby ions of different mass/charge ratio are deflected by different amounts and the amount of deflection, or the field required to produce a standard deflection, is employed as a measure of the mass/charge ratio. The technique of mass spectrometry has been developed to a very high degree of precision and is used to analyze many materials as to their composition and molecular structure. The precision obtainable is generally limited by the precision with which the magnetic field is known. This also requires that the magnetic field can be reproduced in succeeding runs to within a high degree of accuracy.

The field strength usually employed in devices utilizing an electromagnet is generally of the order of several thousand gauss and because of the high field strength requirement the electromagnet structure is usually large and heavy and consequently also expensive. For this reason apparatus of this type is usually designed so that the air gap between the poles of the electromagnet is no larger than necessary to accommodate the apparatus with which measurements are to be made. For the same reason there is usually insufficient space in the air gap of the electromagnet to accommodate any auxiliary magnetic-field strength measuring apparatus. It is apparent that if the air gap is enlarged to accommodate any special apparatus for measuring the magnetic field itself, this would entail considerable extra expense in enlarging the electromagnet as well as the expenditure of additional electrical energy, in addition to increasing the overall size and weight of the device.

Various devices have been used in the prior art to measure and/or control the field of an electromagnet with high precision, one such device being the nuclear magnetic resonance fluxmeter. This device measures the magnetic field in absolute terms to a high degree of precision. However, its operation depends on the presence of a uniform magnetic field and it therefore must be used at the center of the air gap between poles of the electromagnet. In some commercial electromagnets the center of the pole pieces has been removed in order to save weight, leaving only a sector that is required for the desired measurement as in mass spectrometers. In other applications such as in NMR or EPR equipment the center of the air gap is filled with measuring equipment in the exact region where the nuclear magnetic resonance probe must be used. Therefore, the nuclear magnetic resonance fluxmeter leaves much to be desired.

The field of an electromagnet is known to vary with the electric current through its windings but it is well known that for precise measurements the magnetizing current cannot be employed as a measure of the field. Large electromagnets generally require the expenditure of considerable electric power in the energizing coils and in some very large electromagnets the coils must be water-cooled in order to dissipate the heat generated by the substantial electric power required. As a result of the heat dissipation in the surrounding windings, the temperature of the steel core of the electromagnet usually varies during the time the power is turned on. It is well known that the permeability of the steel core varies rapidly with temperature, so that the flux produced by a given magnetizing current will depend on the temperature of the core. Furthermore, heating effects may change the dimensions of both the magnetizing coil and the core and these effects also contribute toward varying the flux in the air gap of the electromagnet. In addition, if the magnetizing current is adjusted to different levels or is turned on and off, and especially if it should be reversed for any purpose, magnetic hysteresis effects occur so that the flux does not subsequently attain the same value for the same energizing current. Whereas the energizing current may be used as a rough control of the magnetic field, it is unsuitable for precise control and is especially unsuitable when the magnetizing current requires adjustment to different levels or is repeatedly turned off and on and/or reversed.

It is the purpose of this invention to provide apparatus for controlling or regulating the field of an electromagnet and which apparatus does not require space in the useful air gap of the electromagnet and which is capable of either regulating the field to accurately maintain a desired field value or adjusting the field to any desired accurately calibrated value.

It is a further purpose of this invention to provide apparatus for the precise control of the field of an electromagnet, which apparatus is relatively inexpensive and can be assembled from standard laboratory components.

It is a further object of this invention to provide apparatus for controlling or regulating the field of an electromagnet to a high degree of precision and which apparatus is not dependent on vagaries of the magnetic circuit.

These and other objects of this invention are attained by the apparatus described in this specification, of which the drawings form a part, and in which like numerals refer to similar elements.

Figure 1:
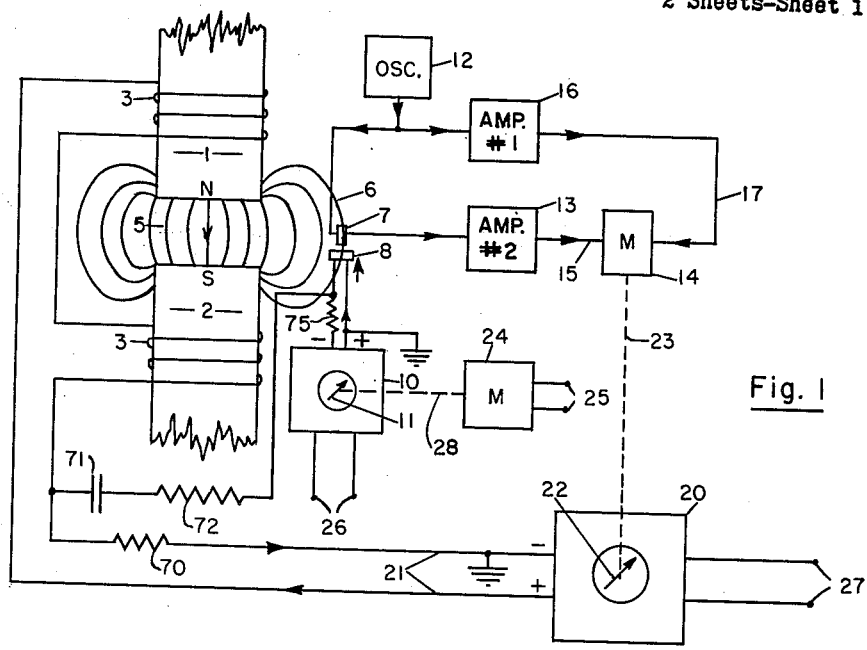
FIGURE 1 is a schematic diagram of one embodiment of the invention employing an electromechanical servo system as part of the means for regulating the electromagnet current.

The invention comprises a magnetic detector, which may for example be of the well known flux-gate variety, located in the fringe field of the electromagnet where it occupies no useful space. It is preferred that the monitoring detector be located at a monitor location in the fringe field where the field of the electromagnet is small compared to the field in the air gap proper, for example, in the ratio of one to a thousand, but in a region where the fringe field of the magnet is still large compared to the earth's magnetic field in order that geomagnetic variations do not form an appreciable fraction of the field at the monitor point. In monitoring the electromagnet field, a standard magnetic field is provided against which the electromagnet field at the monitor location is compared by the magnetic detector. The standard field may be supplied by a suitably stable permanent magnet or by a coil energized by an electric current from a standardized electric circuit. By employing a buck-out type of compensating system the magnetic detector operates at a very low or substantially zero net field, and therefore may be made to attain a high degree of sensitivity. When a coil is employed to produce the standard magnetic field, the coil current is obtained from a standardized power supply that may contain a standard cell or other standard voltage source. Automatic means are provided for maintaining the standard magnetic field at a desired value (which may be either fixed or varying as will be explained later). The standard magnetic field is calibrated by appropriately calibrating its electric circuit so that an accurately known buck-out effect is produced. Deviations of the electromagnet field from exactly balancing the standard field is detected at the monitor point in the fringe field of the electromagnet by the magnetic detector, and the output signal from the latter is connected to a regulator associated with the current controller of the electromagnet.

The magnetic detector employed is of a type capable of detecting very small magnetic fields and is therefore capable of detecting minute deviations of the electromagnet fringe field from the standard buck-out field. The control of the magnetizing current to the electromagnet is thus made to have a precision of the same degree as that of the standard buck-out field. The electromagnet control of this invention is dependent on the actual magnetic field produced by the electromagnet and not on the magnetizing current itself. The degree of precision obtainable with the electromagnet field is in this invention ultimately limited by the precision with which it is possible to maintain the standard buck-out field, which in turn depends on the stability of the E.M.F. of the standard voltage source employed. Since the latter devices have been developed to a high degree of precision and stability, the apparatus of this invention affords means for controlling the field of an electromagnet with equally high precision and stability.

Referring to FIGURE 1, the electromagnet is indicated by pole pieces 1 and 2 wound with coils 3 through which magnetizing current is passed so as to set up a magnetic flux 5 in the air gap of the electromagnet in conventional manner. The electromagnet is indicated merely by its pole pieces 1 and 2 and it is to be understood that these are connected with a yoke in conventional manner. The coils 3 are connected so that their magnetomotive forces are additive, and whereas two magnetizing coils are indicated, it is to be understood that these may be replaced by a plurality of coils or by a single magnetizing coil on the yoke of the electromagnet. The pole pieces are designed so as to produce a substantially uniform useful flux 5 in the air gap of the electromagnet as is well known in the art. However, there is always a substantial fringe field 6 which surrounds the magnetic pole pieces and which may extend to a considerable distance away from the electromagnet core itself.

In accordance with this invention a magnetic detector 7 is placed at a location, termed the monitor location, which is outside the air gap and in the fringe field of the electromagnet. The magnetic detector 7 is oriented so that its principal magnetic axis is substantially parallel to the fringe field 6 at the monitor location of the magnetic detector 7. A coil 8 is associated with the magnetic detector and may in some instances be wound directly on the magnetic detector 7. The coil 8 is energized with direct current so that the coil produces at the monitor location a field that is substantially parallel to the fringe field 6 at the monitor location and oppositely directed. The field of coil 8 forms the standard field against which the electromagnet field 6 is compared and the net field is the field that affects the magnetic detector 7. For convenience the coil 8 is termed the compensating coil but its function is to produce a magnetic field that is a standard of comparison. The compensating coil 8 is connected by wires to a self-regulated power supply 10 that is a source of direct current. The power supply 10 is provided with a calibrated adjusting means 11 for adjusting the direct current supplied by the power supply 10 to the compensating coil 8. The power supply 10 may be supplied with power over leads 26 connected to conventional house current. Direct-current power supplies of this type having a high degree of stability are available on the market from a number of manufacturers.

It is preferred that the magnetic detector 7 be of the well-known flux-valve type since devices of this type have no moving parts are relatively small and of light weight, and can be designed to attain a high degree of sensitivity. The flux-valve 7 is energized by alternating current from an oscillator 12, which may for example produce an A.-C. energizing signal of 400 c.p.s. The output signal from the flux-valve is detected and amplified by detector-amplifier 13 in conventional manner, the amplifier 13 having sufficient power output to drive one phase of a two-phase servomotor 14. The signal delivered from amplifier 13 over lead 15 will depend on the net magnetic field at the flux-valve 7, and the phase of the signal in lead 15 will reverse when the net field at the flux-valve 7 reverses. The flux-valve output signal in lead 15 thereby supplies a variable signal whose phase depends on the direction of the net field at the magnetic detector 7. The fixed phase of servomotor 14 is excited by signal from oscillator 12 amplified by amplifier 16 connected to the servomotor via lead 17. The system comprising elements 7, 12, 13, 14, and 16 is in all respects conventional and may for example be of the type described in U.S. Patent 2,761,123.

The magnetizing coils 3 of the electromagnet are connected by wires 21 to a controllable D.-C. power supply 20 which draws power from conventional house current over wires 27. The power supply 20 is conventional in all respects and comprises means for supplying a controlled and regulated D.-C. current to the magnetizing coils 3 of the electromagnet. The power supply 20 may for example be of the type shown in FIGURE 7–17 on page 231 of The Radio Amateur's Handbook, 38th edition, 1961, published by the American Radio Relay League of West Hartford, Connecticut. Power supplies of this type are customarily provided with a control knob (on variable resistor $R_1$ of the aforementioned reference) indicated by knob 22 by means of which the power supply 20 is adjusted to furnish the desired amount of direct current to the electromagnet over leads 21. The servomotor 14 is mechanically connected to the knob 22 as indicated by the dashed line 23. It is to be understood that the mechanical connection 23 may comprise a gear box for reducing the rotation of the servomotor as applied to the knob 22. The mechanical connection 23 is arranged so that the servomotor 14 turns the knob 22 in such a direction as to reduce to a minimum the net magnetic field at the magnetic detector 7, i.e. to reduce to a minimum the output signal from the magnetic detector 7.

The adjustment 11 of the compensating current supply 10 is set so that the current supplied to coil 8 produces a standard magnetic field in a direction opposite to the field produced by the electromagnet at the magnetic detector 7. Under these conditions the detector 7 is subjected to a net magnetic field which is small, and therefore the detector 7 may be designed to attain high sensitivity. The signal output from the detector system (elements 7, 12, 13, 14, 16) results in rotation of the servomotor 14 in one direction or the other and this serves to adjust the power supply 20 to deliver a current to the magnetizing coils 3 of the electromagnet so that the fringe field of the latter is substantially equal to the standard field of coil 8. The current required in the compensating coil 8 is relatively small inasmuch as it needs to buck-out only the relatively small fringe field 6 of the electromagnet. The buck-out coil 8 therefore requires only a relatively small current to be delivered by the power supply 10. The power supply 10 for supplying a small current with a high degree of stability may for example be a type CS–117 made by North Hills Electric Company Inc. of Mineola, New York. The apparatus illustrated in FIGURE 1 serves to control the very much larger field of the electromagnet to the same degree of stability as that attained in the power supply 10 since the precision obtainable by the magnetic detector is very much greater and may be of the order of .001 percent. Variations in the temperature of the electromagnet structure (except for dimensional changes which presumably can be eliminated) will not affect the degree of control attained since the magnetic detector 7 is sensitive only to the field actually produced by the electromagnet as balanced against the standard field of coil 8. The geometrical relationships of the electromagnet structure, as well as the geometrical relationship between the electromagnet structure and coil 8 and magnetic detector 7 must of course be accurately maintained in order to attain a high degree of precision.

Inasmuch as the magnetic detector 7 may be subjected to some component of the earth's magnetic field as well as the field 6 of the electromagnet and of the compensating coil 8, and since it is well known that the earth's magnetic field varies from time to time through the course of the day, it is advantageous to place the magnetic detector 7 at a monitor location in the fringe field of the electromagnet such that the magnetic detector 7 is in substantially zero terrestrial field. This can be accomplished by so arranging the monitor location and apparatus orientation that the magnetic detector 7 is oriented with its principal magnetic axis in a plane that is perpendicular to the terrestrial magnetic vector. However, this is not always practical and since local magnetic disturbances other than the terrestrial magnetic field may also influence the detector 7, it is advisable to mount the detector 7 in a fringe field that is substantially higher than any known or anticipated extraneous magnetic field. This implies that the detector 7 should be located in the strongest practical fringe field. However, the compensating field produced by a practical compensating coil 8 using nominal current values usually sets an upper limit to the electromagnet fringe field that can be employed at the monitor location. At such a monitor location the diurnal and magnetic storm variations in the earth's magnetic field and variations in extraneous magnetic field become an insignificant part of the total magnetic field at the monitor location of magnetic detector 7. However, the useful field in the air gap of the electromagnet may be several thousand times higher than the fringe field at the location of the magnetic detector 7.

In order to change the field of the electromagnet one may change the standard field produced by coil 8 by changing the adjustment 11 of the power supply 10 to change the current through the compensating coil 8. It is apparent that upon each change of adjustment of the field in compensating coil 8 the operation of the magnetic detector system through servomotor 14 which regulates the power supply 20 will cause the field of the electromagnet to vary in similar manner. In certain applications it is necessary to adjust the field of the electromagnet through regular steps or slowly sweep the field of the electromagnet through a range of values, and this is conveniently done by mechanically connecting a sweepmotor 24 to the adjustment 11. The latter mechanical connection is indicated by dashed line 28 and may include an appropriate gear box (not shown). The sweepmotor 24 is supplied with power through leads 25 which may be connected through an appropriate programing switch (not shown) which automatically effects changes in adjustment and/or sweep speed as required by the particular application. The functions of elements 70, 71, 72, and 75 of FIGURE 1 will be explained later.

Figure 2:
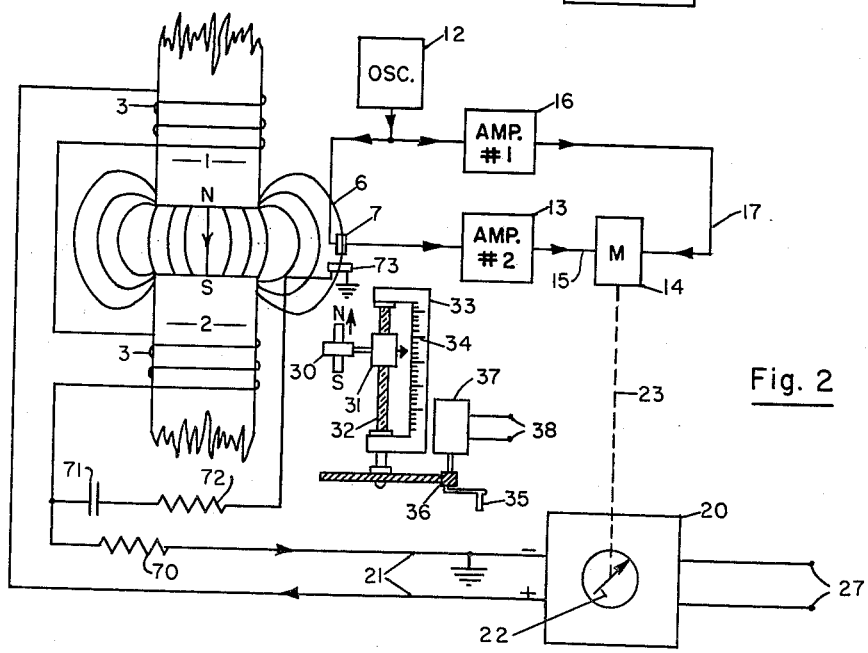
FIGURE 2 is a schematic diagram of an embodiment of this invention employing a permanent magnet as a standard of comparison and an electromechanical servo system for regulating the electromagnet current.

FIGURE 2 is a schematic diagram of an embodiment of the invention in which a calibrated permanent magnet is employed as a standard of comparison. As in FIGURE 1, the electromagnet is indicated merely by its pole pieces 1 and 2 and its magnetizing coils 3 are connected to controllable D.-C. power supply 20 which is supplied with house current through leads 27 and is provided with control knob 22 for varying the electromagnet current supplied over leads 21. Magnetic detector 7 is placed in the fringe field 6 of the electromagnet and excited from oscillator 12 as in FIGURE 1. Servomotor 14 is driven by the amplified output from detector 7 operating into its variable phase, and the amplified exciting signal is applied to its fixed phase in a manner similar to that explained with respect to FIGURE 1. The standard buck-out field is obtained from a calibrated permanent magnet assembly indicated by numeral 30. The calibrated permanent magnet 30 is oriented in such a way as to produce at the monitor location of magnetic detector 7 a field that is substantially parallel to and opposite in direction to the fringe field 6 of the electromagnet. In FIGURE 2 the calibrated permanent magnet 30 is shown axially aligned with the magnetic detector 7 but this is by way of illustration only and it is to be understood that the magnet 30 may be placed at any convenient location so that the field of the magnet 30 is substantially parallel to and in opposition to the fringe field 6 of the electromagnet at the location of magnetic detector 7. Inasmuch as the stability of the electromagnet flux attained by the embodiment of FIGURE 2 depends on the stability of the compensating flux produced by the calibrated permanent magnet 30, it is preferred to employ a magnet assembly 30 having substantially zero temperature coefficient. Such a magnet assembly is shown for example in Wyckoff Patent 2,906,929. The calibrated magnet assembly 30 is mounted on means for accurately adjusting its position mechanically with respect to the monitor location of magnetic detector 7, as for example by mounting the magnet assembly 30 on a traveling nut 31 that rides on a lead screw 32 in a fixed holder 33. The nut 31 may be provided with an index and the fixed holder provided with a scale 34 for positioning the magnet 30. Calibration of scale 34 will generally not be linear. By turning the crank 35 geared to the lead screw 32, the distance between the magnet 30 and the monitor location of magnetic detector 7 may be varied and since the field of magnet 30 varies with distance, it is clear that the buckout or compensating field produced by the calibrated magnet 30 at the monitor location will vary accordingly. The lead screw 32 may be provided with gears 36 and a sweepmotor 37, the latter being energized through leads 38 connected to a programing switch (not shown).

In FIGURE 2 control of the electromagnet is effected with respect to the standard field of the calibrated buckout magnet 30. The magnetic detector 7 detects the differential or net field between the field of the magnet 30 and the fringe field 6 of the electromagnet. The output of the magnetic detector 7 as delivered to servomotor 14 acting through mechanical connection 23 varies the adjustment 22 of the power supply 20 in such manner as to reduce the field detected by magnetic detector 7 to a minimum value. In this manner the field of the electromagnet is controlled to the same degree of precision as the stability of the standard field produced by the calibrated permanent magnet 30. Variations in the temperature of the electromagnet or its coils will not affect the degree of control attained (assuming dimensional stability of the various structural elements) since the magnetic detector is sensitive only to the field actually produced by the electromagnet as balanced against the field of the buckout magnet 30. It is apparent that the geometrical relationship between the electromagnet and the buck-out magnet 30 and the magnetic detector 7 must be accurately maintained in order to attain a high degree of precision. To this end it is preferred to mount the magnetic detector 7 on a median plane between the poles of the electromagnet substantially as shown in FIGURE 2. It is also desirable to mount both the magnet 30 and detector 7 on supports made of material having a low temperature coefficient of expansion (not shown) fastened directly to the electromagnet structure. It is to be understood that FIGURE 2 is merely diagrammatic and ordinarily, since the calibrated compensating magnet 30 is much weaker than the electromagnet, the magnetic detector 7 will generally be closer to the calibrated compensating magnet 30 than to the electromagnet. The functions of elements 70, 71, 72, and 73 will be explained later.

Under some conditions it may be desirable to employ a combination of a compensating coil such as 8 of FIGURE 1 and a calibrated magnet such as 30 of FIGURE 2 to produce the buck-out effect at the monitor location. Such an arrangement is convenient when the current deliverable by an available power supply 10 is inadequate to produce the required compensation effect in the coil 8 and it is desired to augment the compensation by using a calibrated permanent magnet 30.

Figure 3:
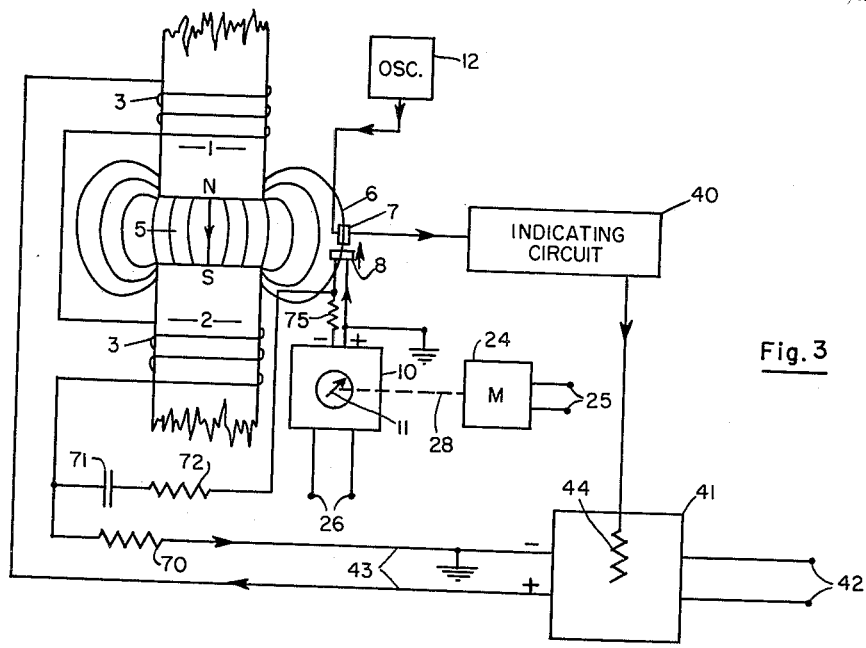
FIGURE 3 is a schematic diagram of an embodiment of this invention employing electronic control for regulating the electromagnet current.

Referring now to FIGURE 3 which shows a schematic diagram of an embodiment of the invention employing completely electronic control, the electromagnet pole pieces are indicated by 1 and 2 having coils 3 and producing a useful flux 5. A flux-valve type of magnetic detector 7 is located in the fringe field 6 of the electromagnet. The magnetic detector 7 is oriented so that its principal magnetic axis is substantially parallel to the fringe field 6 of the electromagnet at the monitor location of magnetic detector 7. A compensating coil 8 is magnetically coupled to the detector 7 and the field produced by the current in coil 8 serves as a reference standard. The field of coil 8 at the monitor location is substantially parallel to the fringe field 6 of the electromagnet at the monitor location and is oppositely directed. The compensating coil current is supplied by stabilized D.-C. power supply 10 having a calibrated adjusting knob 11. The power supply 10 is supplied with house current over leads 26.

In FIGURE 3 the flux-valve 7 is excited by A.-C. from oscillator 12 and the flux-valve output is fed into an indicating circuit 40, although circuit 40 does not necessarily require a visual indicator. The elements 12, 7, and 40 are conventional and by way of example may be of the type shown in U.S. Patent 2,809,345. The output signal of indicating circuit 40 is a direct-current voltage whose magnitude is proportional to the net magnetic field affecting the flux-valve 7 and whose polarity reverses when the net field at flux-valve 7 reverses.

The electromagnet current is supplied over leads 43 by an electronically regulated power supply 41 which is powered from house current leads 42. The power supply 41 may be of any conventional type that includes a thermionic regulator tube whose grid is schematically indicated in FIGURE 3 by 44. By way of example, such an electronically regulated power supply may be of the type shown in FIGURE 7-17 on page 231 of The Radio Amateur's Handbook, 38th edition, 1961, published by the American Radio Relay League, West Hartford, Connecticut. Signal from indicating circuit 40 is introduced into the control-grid lead of the control tube of circuit 41. In employing the previously mentioned circuit of U.S. Patent 2,809,345 to control the electronically regulated power supply shown in said Handbook circuit, the signal delivered across condenser 53 of said patent is introduced into the control-grid lead 1 of tube 6AU6 of said Handbook circuit, except that the filter comprising elements 46, 47, and 53 of said patent is ungrounded in the present instance, the latter being accomplished by employing well-known electronic gate circuits instead of the synchronous vibrating switch 34 shown in said U.S. Patent 2,809,345. Accordingly, the regulated output on leads 43 supplying magnetizing direct current to the electromagnet coils 3 will be controlled in response to the output signal from flux-valve 7. The control is phased so that flux-valve output from the indicating circuit 40 will affect the current output of regulator 41 to reduce the flux-valve output to a minimum, whereupon the fringe field 6 of the electromagnet at the flux-valve (monitor) location will substantially (i.e. within a very small error signal) balance the field of the compensating coil.

In order to change the field of the electromagnet, the field of the compensating coil 8 is adjusted by means of a calibrated knob 11 on its power supply 10. In the event that it is desired to sweep the electromagnet field the knob 11 of the power supply 10 may be slowly driven by programing motor 24 supplied with power through leads 25 connected to an appropriate programing switch (not shown). The embodiment of the invention illustrated in FIGURE 3, being entirely electronic in its action, achieves rapid and accurate control of the electromagnet field. The precision with which the field can be controlled and the accuracy with which the field meets a standard value is determined by the calibration precision of the adjustment 11 of the current supplied to coil 8 by power supply 10. It is apparent that the power supply 10 need supply only the nominal amount of current required by the compensating coil 8, as contrasted to the large amount of power required by the electromagnet coils 3. The functions of elements 70, 71, 72, and 75 of FIGURE 3 will be explained later.

Figure 4:
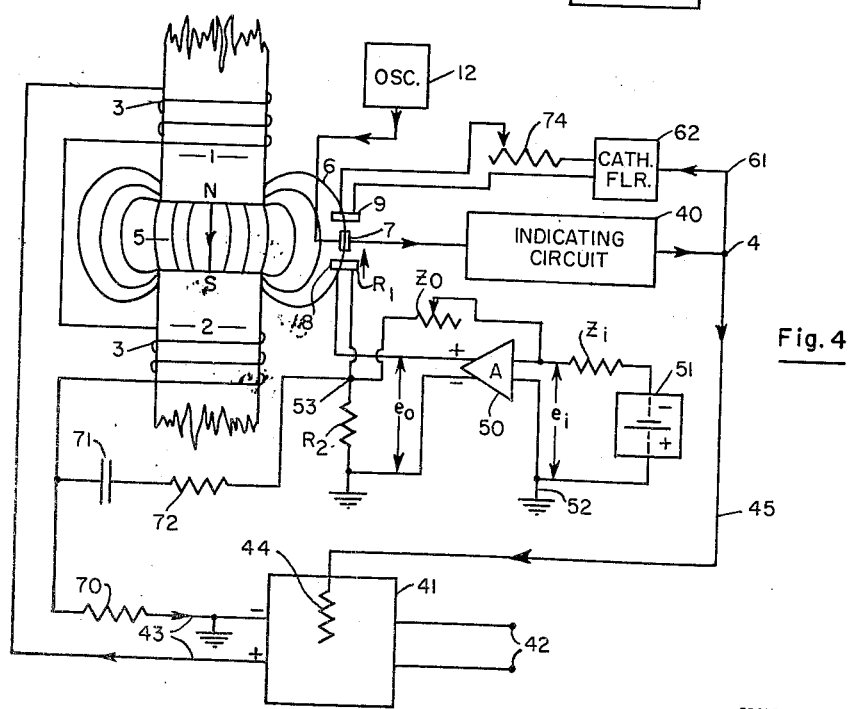
FIGURE 4 is a schematic diagram of a preferred embodiment of this invention having an exceptionally high degree of stability and reproducibility.

FIGURE 4 is a schematic diagram of a preferred embodiment of the invention in which a very high degree of precision and stability of the electromagnet field can be achieved. As in the other figures, the electromagnet is indicated by poles 1 and 2 having magnetizing coils 3 and the electromagnet produces a useful flux 5 and fringe field 6. In the fringe field 6 is placed a flux-valve magnetic detector 7, the latter being energized by A.-C. from oscillator 12. The magnetic detector 7 is oriented so that its principal magnetic axis is substantially parallel to the fringe field 6 of the electromagnet at the monitor location of detector 7. The flux-valve output is fed to an indicating circuit 40 whose output is fed via lead 45 to the grid circuit 44 of the regulator tube in an electronically regulated power supply 41 in a manner in all respects similar to that explained above in connection with FIGURE 3. The thus regulated direct current output of power supply 41 is delivered over leads 43 to the coils 3 of the electromagnet. Power supply 41 is connected to house current by leads 42.

A standard field is set up by means of a calibrated direct current in compensating coil 8. The coil 8 is oriented and phased so that its field at the location of magnetic detector 7 is substantially parallel to the fringe field 6 of the electromagnet at the monitor location and is oppositely directed. In the embodiment of FIGURE 4 the compensating coil 8 is supplied with current obtained from a high-gain operational amplifier 50 connected in a network that includes a source of substantially constant E.M.F. as shown. The amplifier 50 has a very high gain and its input impedance is also high. The input circuit of amplifier 50 comprises a standard voltage source indicated by the block 51, whose positive terminal is connected to ground as shown at 52. The standard voltage source 51 may simply comprise a conventional standard cell of well-known type. The standard voltage source 51 is connected in series with a precision resistor $Z_1$. The input voltage thus applied to the input of amplifier 50 is designated as $e_i$. The output circuit of amplifier 50 comprises the compensating coil 8 of resistance $R_1$ connected in series with a precision resistor $R_2$. The negative terminal of resistor $R_2$ is connected to ground as shown. The output voltage appearing across these two resistances is designated as $e_o$. The junction point 53 between the compensating coil 8 and resistor $R_2$ is connected through an adjustable precision resistor $Z_o$ to the high side of the input circuit of amplifier 50 as indicated in FIGURE 4. The network comprising elements 50, 51 $Z_i$, $Z_o$, $R_1$, and $R_2$ is well known in the operational amplifier art. The amplifier 50 may for example be a Model 111 Series Wideband D.-C. Amplifier made by Kin Tel, a Division of Cohu Electronics Inc., San Diego, California. For maximum precision the elements 51, $Z_1$, $Z_o$, and $R_2$ are placed in a temperature-controlled thermally insulated container to eliminate the effects of temperature variations on these elements.

Briefly, the theory of the operational amplifier network is as follows: The gain of the system is defined as $e_o/e_i$. Under conditions of infinite amplifier gain, the relationship holds that Gain$=e_o/e_i=-Z_o/BZ_i$ where $B=R_2/(R_1+R_2)$. From this $e_o/e_i=-Z_o(R_1+R_2)/R_2Z_i$. This relationship is maintained for all practical purposes when the amplifier gain is very large such as when using the above-mentioned Kin Tel operational amplifier which has an open loop gain of about $17\times10^6$. The current through $R_1$ (i.e. the compensating coil 8) is given by $i_o=e_o/(R_1+R_2)$ or $e_o=i_o(R_1+R_2)$. Substituting this expression for $e_o$ in the foregoing equation, one obtains $i_o(R_1+R_2)/e_i=-Z_o(R_1+R_2)/R_2Z_i$. The quantity $$(R_1+R_2)$$

cancels out, leaving $$i_o/e_i=-Z_o/R_2Z_i$$

or $$i_o=-Z_oe_i/Z_iR_2$$

and this is the expression for the current in the compensating coil 8. The value of $e_i$ is determined by the E.M.F. of the standard voltage source 51. The resistances $R_2$, $Z_o$, and $Z_i$ are calibrated precision resistors of known value. Note that the resistance $R_1$ of the compensating coil itself does not appear in the above expression for the compensating coil current $i_o$, so that variations in the resistance of compensating coil 8 do not affect the compensating coil current. It is however necessary to accurately maintain the geometry of the compensating coil 8 with respect to the electromagnet and the flux-valve 7 and all other magnetic elements, since the flux-valve 7 monitors the net field of coil 8 and the electromagnet and the fields at the monitor point are dependent on the dimensions of the system.

It is apparent from the foregoing expression for $i_o$ that this current may be changed in known ratio by changing the ratio $Z_o/R_2$, which is most conveniently done by changing $Z_o$. Thus in order to sweep the field, it is merely necessary to vary the adjustable resistor $Z_o$. If desired, the adjustment of $Z_o$ may be accomplished by means of a programing motor (not shown in FIGURE 4). On the other hand, the ratio $Z_o/R_2$ is not affected by changing $Z_i$, and accordingly it is convenient to make minor adjustments in the value of $Z_i$ for the purpose of correcting calibration errors, etc. which for example may arise because of slight misalignment between the principal magnetic axes of the compensating coil 8 or of flux-valve 7 with respect to the fringe field 6 of the electromagnet at the monitor location. As previously indicated, the precision resistors $R_2$, $Z_o$, and $Z_i$ are kept at constant temperature as also is the standard voltage source 51.

The circuits of FIGURE 4 so far described are in function similar to those of FIGURES 1, 2, and 3. However, it is preferred to add a further stabilizing coil 9 as shown in FIGURE 4 when using an electronic controller. The electronic loop comprising indicating circuit 40 and regulated power supply 41 has a finite gain and (without the stabilizing coil 9) a small net field at the monitor location (error signal) is required to maintain a given output effect. For example, if the gain of this loop is 500, then the input to the loop must be 1/500 of the output of the loop, and in order to effect a correction of electromagnet drift of say 5 percent, an error signal of 1/500 of 5 percent or 0.01% in the net field at the monitor location is required. This gives rise to a small error in the control system of FIGURE 3, but this error can be accurately eliminated by employing the stabilizing coil 9 as will become evident.

Coil 9 is oriented so that its magnetic field at the monitor location of magnetic detector 7 is substantially parallel to the fringe field of the electromagnet at the monitor location. The field of stabilizing coil 9 affects the magnetic detector 7 and combines with the field 6 of the electromagnet and the field of the compensating coil 8 at the monitor location. Output from the indicating circuit 40 is fed by means of lead 61 to a conventional signal-follower circuit 62, whose output is passed through the coil 9 in series with an adjustable resistor 74. In this manner there is applied to coil 9 a current whose magnitude is proportional to the output of magnetic detector 7 and whose direction reverses when the output of magnetic detector 7 reverses. When magnetic detector 7 produces an output as a result of a net field at the monitor location without coil 9, the coil 9 is then connected and phased so that its field is in the same direction as the net field without the coil 9. It is possible by employing the stabilizing coil 9 in this manner to attain a very high degree of precision in the field of the electromagnet.

The theory of operation of the system illustrated in FIGURE 4 may be simply analyzed as follows: Consider the direction of the standard field of compensating coil 8 to be the positive direction. Then the net field $f_7$ experienced by the magnetic detector 7 is the net effect of the field $f_8$ of the compensating coil 8, minus the fringe field $f_6$ of the electromagnet, plus the field $f_9$ of the stabilizing coil 9; namely $f_7=f_8-f_6+f_9$. Let the transfer function for the branch of the network from magnetic detector 7 to junction point 4 be denoted by $G_1$, the transfer function for the branch of the network from the junction point 4 through the power supply 41 to the electromagnet fringe field 6 be denoted by H, and the transfer function for the branch of the network from the junction point 4 through the cathode follower 62 to the field of stabilizing coil 9 be denoted by $G_1$. Also let the signal at junction 4 be denoted by $f_4$. Thus by definition we have $$G_1=f_4/f_7,\ G_2=f_9/f_4,\ H=f_6/f_4$$

From these definitions we get $$f_4=G_1f_7,\ f_9=G_2f_4=G_1G_2f_7$$

and $f_6=Hf_4=G_1Hf_7$. The precision with which the field $f_6$ of the electromagnet is held with respect to the standard field $f_8$ of the compensating coil will be expressed by the ratio $f_6/f_8$. This may be computed by substituting the above values in the foregoing expression for $f_7$ to eliminate $f_4$ and $f_7$ and $f_9$. When this is done, one obtains the expression $f_6/f_8=G_1H/(G_1H+1-G_1G_2)$.

From this it is apparent that by making $G_1G_2=1$ it becomes possible to achieve perfect stabilization in which $f_6/f_8=1$. This means that under such a condition if the standard field $f_8$ of the compensating field is for example doubled, the electromagnet field $f_6$ will be controlled to exactly double. If $G_1G_2$ has a value less than unity then the system operates so that the electromagnet field does not quite meet the standard field, i.e. the field is under-compensated, while on the outer hand, if $G_1G_2$ is greater than unity the electromagnet field will be overcompensated. Adjustment of the value of $G_1G_2$ to the value that gives exact compensation is most conveniently accomplished through adjustment of $G_2$ by means of the adjustable resistor 74.

It is therefore seen that the embodiment of FIGURE 4 provides for a convenient means to adjust the standard field of the compensating coil 8 to accurately calibrated values. The overall time stability obtainable is limited chiefly by the time stability of the standard voltage source 51 (since the resistors $R_2$, $Z_i$, and $Z_o$ can be held very closely), by the effects of stray outside magnetic influence (e.g. terrestrial magnetic storms or local magnetic interference), and by the time stability of the geometry of the electromagnet, coils 8 and 9, and magnetic detector 7. Variations in the geometry can best be avoided by placing the entire apparatus in a room of constant temperature and mounting elements 7, 8, and 9 on the electromagnet core structure with non-magnetic material of substantially zero temperature coefficient of expansion, as for example quartz or materials known to the trade as Vycor or Stupalith. By employing an electromagnet equipped with water cooling the requirement for closely regulated room temperature is considerably relaxed.

In order to avoid hunting in any of the embodiments of FIGURES 1, 2, 3 or 4 it is preferred to add the resistor 70 in series with the electromagnet current supply and to connect a coupling condenser 71 and resistor 72 as shown in each of the figures. This circuit provides derivative damping through capacitative negative feedback in well-known manner. The resistor 70 is in the negative or grounded lead from the power supply 20 of FIGURES 1 and 2, and power supply 41 of FIGURES 3 and 4. The junction point of the resistor 70 and the electromagnet coils is connected through condenser 71 and series resistor 72 to the negative supply lead of the compensating coil in FIGURES 1, 3, and 4 as shown in these figures. In the embodiment of FIGURE 2, which the permanent magnet 30 is employed instead of a compensating coil to produce the standard field, it is necessary to add a coil 73 connected from resistor 72 to ground as indicated in FIGURE 2. Coil 73 is connected in such direction that when the current in the electromagnet suddenly increases, the momentary field of coil 73 is in opposition to the field of the electromagnet. The desired degree of damping is obtained by proper choice of the capacitance of condenser 71 and the values of resistors 70 and 72.

In each of the embodiments described the specifications of the electromagnet power supply 20 or 41 depend on the current and voltage requirements of the particular electromagnet employed. The coil 8 and its power supply 10, or the operational amplifier network of FIGURE 4, are more stable and more easily controlled if designed for low current operation. The number of turns and dimensions in the respective coils are designed for the particular magnetic conditions, the design parameters for such coils being well known to those skilled in the art. The coil 8 and also the coil 9 of FIGURE 4 and the coil 73 of FIGURE 2 are preferably wound directly on the flux-valve 7 for the purpose of achieving maximum mechanical stability of the geometrical relationship of these elements. However, by winding coils 8, 9, and 73 directly on the flux-valve 7 there results close coupling of the flux-valve and these respective coils, and accordingly the impedance of the coil circuits must be kept high in order not to excessively load up the circuit of flux-valve 7. To this end the power supply 10 in FIGURES 1 and 3 should have a high output impedance, or alternatively a resistor 75 (shown in FIGURES 1 and 3) is connected in series with coil 8 in order to prevent loading effects. In all the figures the respective resistors 72, $R_2$, and 74 are made sufficiently high to avoid loading effects. The flux-valve and coil assembly is preferably mounted on supports made of material having a low temperature coefficient of expansion rigidly fastened to the electromagnet core structure so as to attain maximum stability of the geometrical relationship between the flux-valve and coil assembly and the electromagnet itself.

This invention provides a means of regulating and/or maintaining the field of an electromagnet to a very high degree of precision and stability. By employing the fringe field of the electromagnet no otherwise usable space in the air gap of the electromagnet is required. The system employed is relatively inexpensive and for the most part comprises components readily available.

What we claim as our invention is:

1. A control system for maintaining constant the field of an electromagnet energized by a source of magnetizing current comprising a current controller connected to the source of magnetizing current and to the electromagnet, a magnetic detector located in the field of the electromagnet, said magnetic detector being oriented so that its principal magnetic axis is substantially parallel to the field of the electromagnet at the location of said detector, standardized magnetic field compensating means influencing said magnetic detector, said magnetic field compensating means being oriented to produce a magnetic field substantially in alignment with and in opposition to the field of the electromagnet at the location of said magnetic detector, signal-detecting means connected to said magnetic detector, and regulating means connected to said signal-detecting means and to said current controller regulating said current controller so as to maintain a minimum signal output from said magnetic detector.

2. A control system for adjusting the field of an electromagnet energized by a source of magnetizing current comprising a current controller connected to the source of magnetizing current and to the electromagnet, a magnetic detector located in the field of the electromagnet said magnetic detector being oriented so that its principal magnetic axis is substantially parallel to the field of the electromagnet at the location of said magnetic detector, electric-current actuated magnetic field compensating means influencing said magnetic detector, said magnetic field compensating means being oriented to produce a magnetic field substantially in alignment with and in opposition to the field of the electromagnet at the location of said magnetic detector, means connected to said magnetic field compensating means for adjusting the magnetic field thereof, signal-detecting means connected to said magnetic detector, and regulating means connected to said signal-detecting means and to said current controller regulating said current controller so as to maintain a minimum signal output from said magnetic detector.

3. A control system for maintaining constant the field of an electromagnet energized by a source of magnetizing current comprising a current controller connected to the source of magnetizing current and to the electromagnet, a magnetic detector located in the field of the electromagnet, said magnetic detector being oriented so that its principal magnetic axis is substantially parallel to the field of the electromagnet at the location of said magnetic detector, a standardized magnet substantially free of temperature variation influencing said magnetic detector, said magnet being oriented so that its magnetic field at the location of said magnetic detector is substantially in alignment with and in opposition to the field of the electromagnet, signal-detecting means connected to said magnetic detector, and regulating means connected to said signal-detecting means and to said current controller regulating said current controller so as to maintain a minimum signal output from said magnetic detector.

4. A control system for maintaining constant the field of an electromagnet energized by a source of magnetizing current comprising a mechanically adjustable current controller connected to the source of magnetizing current and to the electromagnet, a magnetic detector located in the field of the electromagnet, said magnetic detector being oriented so that its principal magnetic axis is substantially parallel to the field of the electromagnet at the location of said magnetic detector, standardized magnetic field compensating means influencing said magnetic detector, said magnetic field compensating means being oriented to produce a magnetic field substantially in alignment with and in opposition to the field of the electromagnet at the location of said magnetic detector, signal-detecting means connected to said magnetic detector, and servo means electrically connected to said signal-detecting means and mechanically connected to said current controller adjusting said current controller so as to maintain a minimum signal output from said magnetic detector.

5. A control system for maintaining constant the field of an electromagnet energized by a source of magnetizing current comprising a current controller connected to the source of magnetizing current and to the electromagnet, a saturable-core type magnetic detector located in the field of the electromagnet, a self-regulating compensating-current supply means supplying a substantial constant electric current to said magnetic detector in such direction as to produce a magnetic field in opposition to the field of the electromagnet at the location of said magnetic detector, signal-detecting means connected to said magnetic detector, and regulating means connected to said signal-detecting means and to said current controller regulating said current controller so as to maintain a minimum signal output from said magnetic detector.

6. A control system for maintaining constant the field of an electromagnet energized by a source of magnetizing current comprising a current controller connected to the source of magnetizing current and to the electromagnet, a magnetic detector located in the field of the electromagnet, a coil wound around said magnetic detector, a self-regulating compensating-current supply means supplying a substantially constant electric current to said coil in such direction as to produce a magnetic field in opposition to the field of the electromagnet at said magnetic detector, signal-detecting means connected to said magnetic detector, and regulating means connected to said signal-detecting means and to said current controller regulating said current controller so as to maintain a minimum signal output from said magnetic detector.

7. A control system for maintaining constant the field of an electromagnet energized by a source of magnetizing current comprising a current controller connected to the source of magnetizing current and to the electromagnet, a magnetic detector located in the field of the electromagnet, said magnetic detector being oriented with its principal axis substantially parallel to the field of the electromagnet at the location of said magnetic detector, a coil adapted to produce a compensating magnetic field at the location of said detector, said coil being oriented so that said compensating magnetic field is substantially parallel to the field of the electromagnet at the location of said magnetic detector, a self-regulating current supply means supplying a substantially constant electric current to said coil in such direction as to produce a magnetic field in opposition to the field of the electromagnet at the location of said magnetic detector, signal-detecting means connected to said magnetic detector, and regulating means connected to said signal-detecting means and to said current controller regulating said current controller so as to maintain a minimum signal output from said magnetic detector.

8. A system for calibrated adjustment of the field of an electromagnet energized by a source of magnetizing current comprising a current controller connected to the source of magnetizing current and to the electromagnet, a magnetic detector located in the field of the electromagnet said magnetic detector being oriented with its principal axis substantially parallel to the field of the electromagnet at the location of said magnetic detector, a coil adapted to produce a compensating magnetic field substantially parallel to the field of the electromagnet at the location of said magnetic detector, compensating-current supply means connected to said coil supplying an electric current thereto in such direction as to produce a magnetic field in opposition to the field of the electromagnet at the location of said magnetic detector, a voltage source of substantially contstant E.M.F., an adjustable calibrated electrical network connected to said voltage source and to said compensating-current supply means whereby said compensating current may be adjusted in known proportion to the E.M.F. of said voltage source, signal-detecting means connected to said magnetic detector, and regulating means connected to said signal-detecting means and to said current controller regulating said current controller so as to maintain a minimum signal output from said magnetic detector.

9. A control system for maintaining constant the field of an electromagnet energized by a source of magnetizing current comprising a current controller connected to the source of magnetizing current and to the electromagnet, a magnetic detector located in the field of the electromagnet said detector being oriented so that its principal magnetic axis is substantially parallel to the field of the electromagnet at the location of said magnetic detector, a coil adapted to produce a compensating magnetic field at the location of said magnetic detector said coil being oriented so that said compensating magnetic field is substantially parallel to the field of the electromagnet at the location of said magnetic detector, a voltage source of substantially constant E.M.F., a direct-current amplifier connected to said voltage source and to said coil supplying to said coil a current that is substantially constant with respect to the E.M.F. of said voltage source and in such direction as to produce a magnetic field in opposition to the field of the electromagnet at the location of said magnetic detector, signal-detecting means connected to said magnetic detector, and regulating means connected to said signal-detecting means and to said current controller regulating said current controller so as to maintain a minimum signal output from said magnetic detector.

10. A control system for calibrated adjustment of the field of an electromagnet energized by a source of magnetizing current comprising a current controller connected to the source of magnetizing current and to the electromagnet, a magnetic detector located in the field of the electromagnet, said detector being oriented so that its principal magnetic axis is substantially parallel to the field of the electromagnet at the location of said magnetic detector, a coil adapted to produce a compensating magnetic field at the location of said magnetic detector said coil being oriented so that said compensating magnetic field is substantially parallel to the field of the electromagnet at the location of said magnetic detector, a voltage source of substantially constant E.M.F., an operational amplifier network including at least three calibrated resistors and connected to said voltage source and to said coil supplying to said coil a current that is in known proportion with respect to the E.M.F. of said voltage source and is in such direction as to produce a magnetic field in opposition to the field of the electromagnet at the location of said magnetic detector, signal-detecting means connected to said magnetic detector, and regulating means connected to said signal-detecting means and to said current controller regulating said current controller so as to maintain a minimum signal output from said magnetic detector.

11. A system for calibrated adjustment of the field of an electromagnet energized by a source of magnetizing current comprising a current controller connected to the source of magnetizing current and to the electromagnet, a magnetic detector located in the field of the electromagnet said magnetic detector being oriented with its principal magnetic axis substantially parallel to the field of the electromagnet at the location of said magnetic detector, a first coil adapted to produce a compensating magnetic field substantially parallel to the field of the electromagnet at the location of said magnetic detector, compensating-current supply means connected to said first coil supplying an electric current thereto in such direction as to produce a magnetic field in opposition to the field of the electromagnet at the location of said magnetic detector, a voltage source of substantially constant E.M.F., an adjustable calibrated electrical network connected to said voltage source and to said compensating-current supply means whereby said compensating current may be adjusted in known proportion to the E.M.F. of said voltage source, signal-detecting means connected to said magnetic detector, a second coil adapted to produce a magnetic field substantially parallel to the field of the electromagnet at the location of said detector, a signal-follower circuit connected to said signal-detecting means supplying current to said second coil in such direction as to produce a magnetic field in the same direction as the magnetic field that gives rise to the signal from said magnetic detector, and regulating means connected to said signal-detecting means and to said current controller regulating said current controller so as to maintain a minimum signal output from said magnetic detector.

12. A control system for maintaining constant the field of an electromagnet energized by a source of magnetizing current comprising a current controller connected to the source of magnetizing current and to the electromagnet, a magnetic detector located in the field of the electromagnet, said detector being oriented so that its principal magnetic axis is substantially parallel to the field of the electromagnet at the location of said magnetic detector, a first coil adapted to produce a compensating magnetic field substantially parallel to the field of the electromagnet at the location of said magnetic detector, a voltage source of substantially constant E.M.F., a direct-current amplifier connected to said voltage source and to said coil supplying to said coil a current that is substantially constant with respect to the E.M.F. of said voltage source and is in such direction as to produce a magnetic field in opposition to the field of the electromagnet at the location of said magnetic detector, signal-detecting means connected to said magnetic detector, a second coil adapted to produce a magnetic field substantially parallel to the field of the electromagnet at the location of said magnetic detector, a signal-follower circuit connected to said signal-detecting means supplying current to said second coil in such direction as to produce a magnetic field in the same direction as the magnetic field that gives rise to the signal from said magnetic detector, and regulating means connected to said signal-detecting means and to said current controller regulating said current controller so as to maintain a minimum signal output from said magnetic detector.

13. The apparatus of claim 1 including a resistor in series with the electromagnet and with said current controller, and capacitative negative feedback coupling from the junction point of the electromagnet and said resistor to said magnetic field compensating means.

14. The apparatus of claim 2 including a resistor in series with the electromagnet and with said current controller, and capacitative negative feedback coupling from the junction point of the electromagnet and said resistor to said magnetic field compensating means.

15. The apparatus of claim 3 including a resistor in series with the electromagnet and with said current controller, a coil adapted to produce a magnetic field substantially parallel to the field of the electromagnet at the location of said magnetic detector, and capacitative negative feedback coupling from the junction point of the electromagnet and said resistor to said coil.

16. The apparatus of claim 4 including a resistor in series with the electromagnet and with said current controller, and capacitative negative feedback coupling from the junction point of the electromagnet and said resistor to said magnetic field compensating means.

17. The apparatus of claim 5 including a resistor in series with the electromagnet and with said current controller, and capacitative negative feedback coupling from the junction point of the electromagnet and said resistor to said magnetic detector.

18. The apparatus of claim 6 including a resistor in series with the electromagnet and with said current controller, and capacitative negative feedback coupling from the junction point of the electromagnet and said resistor to said coil.

19. The apparatus of claim 7 including a resistor in series with the electromagnet and with said current controller, and capacitative negative feedback coupling from the junction point of the electromagnet and said resistor to said coil.

20. The apparatus of claim 8 including a resistor in series with the electromagnet and with said current controller, and capacitative negative feedback coupling from the junction point of the electromagnet and said resistor to said coil.

21. The apparatus of claim 9 including a resistor in series with the electromagnet and with said current controller, and capacitative negative feedback coupling from the junction point of the electromagnet and said resistor to said coil.

22. The apparatus of claim 10 including a resistor in series with the electromagnet and with said current controller, and capacitative negative feedback coupling from the junction point of the electromagnet and said resistor to said coil.

23. The apparatus of claim 11 including a resistor in series with the electromagnet and with said current controller, and capacitative negative feedback coupling from the junction point of the electromagnet and said resistor to said first coil.

24. The apparatus of claim 12 including a resistor in series with the electromagnet and with said current controller, and capacitative negative feedback coupling from the junction point of the electromagnet and said resistor to said first coil.

No references cited.